March 3, 1964     C. J. CISLO     3,123,349
HYDRAULIC LEVELING DEVICE WITH INTEGRATED AUTOMATIC CONTROL
Filed March 30, 1961

INVENTOR.
Casimer J. Cislo
BY
W. F. Wagner
ATTORNEY

United States Patent Office
3,123,349
Patented Mar. 3, 1964

3,123,349
HYDRAULIC LEVELING DEVICE WITH
INTEGRATED AUTOMATIC CONTROL
Casimer J. Cislo, Detroit, Mich., assignor to General Motors Corporation, Detroit, Mich., a corporation of Delaware
Filed Mar. 30, 1961, Ser. No. 99,537
9 Claims. (Cl. 267—60)

This invention relates to vehicle suspension and more particularly to coil spring suspension and apparatus associated therewith for maintaining the vehicle sprung mass at a constant height irrespective of load imposed thereon.

An object of the invention is to provide an improved vehicle suspension.

Another object is to provide a coil spring suspension for vehicles incorporating hydraulically extensible upper spring seats which are operable to vary the vertical level of the upper end of the coil spring relative to the sprung mass of the vehicle so that decreased length of the coil spring resulting from increased load on the vehicle sprung mass is offset by increasing the vertical distance between the upper spring seat and sprung mass.

A further object is to provide an arrangement of the stated character wherein the displaceable spring seats incorporate automatic control means which responds directly to load increase on the sprung mass.

A still further object is to provide control means of the stated character which provides a unity ratio response between displacement of the spring seat and compression deflection of the coil spring so that extension displacement of the seat equals the amount of coil spring compression resulting from increased load and thereby maintains the sprung mass at a predetermined normal standing height throughout a substantial range of sprung load.

A yet further object is to provide a hydraulically displaceable spring seat assembly having internally disposed fluid flow control apparatus which senses and responds to variation in sprung load rather than being operated as an indirect function of variation in linear distance between the sprung and unsprung mass of the vehicle.

Still another object is to provide an arrangement of the type described wherein the control means is disposed in series between one end of the coil spring and the sprung mass.

Still a further object is to provide a displaceable spring seat assembly incorporating fluid flow control mechanism including a spool valve which is axially movable in opposite directions from a central neutral position to intake and exhaust positions, wherein displacement of the valve is modulated by a coil spring acting on one side thereof and hydraulic pressure acting on the other side thereof, the hydraulic pressure being derived from the fluid acting to displace the assembly.

In accordance with the general features of the invention, there is provided a hydraulically displaceable upper spring seat assembly wherein a piston rigidly secured to the vehicle sprung mass is surrounded by a cup-shaped cylinder adapted for telescoping movement relative thereto. The piston element is provided with an axially movable spool valve and has hydraulic fluid intake and exhaust passages which are arranged with reference to a spool valve so that flow of fluid into the assembly between the piston and cylinder is controlled by the axial position of the spool valve relative to the piston. To provide for automatic control of the position of the spool valve, the latter is slidably mounted on a rod secured to the cylinder and extending into a cavity in the piston. A coil spring surrounds the portion of the rod above the spool valve and acts through a piston element to urge the spool valve downwardly relative to the piston, while the other end of the spool valve is subject to the hydraulic fluid pressure which displaces the piston and cylinder so that the position of the spool valve relative to the piston is modulated according to the relative pressure of the hydraulic fluid and the coil spring. When the fluid pressure and coil spring pressure are equal, the spool valve occupies a position in the piston preventing either intake or exhaust of hydraulic fluid. Movement of the spool valve from the described position in a direction in which spring force is exerted allows passage of hydraulic fluid into the space between the piston and cylinder, while movement of the spool valve in the opposite direction from the described position allows hydraulic fluid to be exhausted from the space between the piston and cylinder.

A still further object of the invention is to provide an arrangement of the general character described incorporating means for preventing response of the control mechanism to moderate increase in load on the vehicle sprung mass.

These and other objects, advantages, and features of the invention will become more fully apparent as reference is had to the accompanying specification and drawing wherein.

Figure 1:
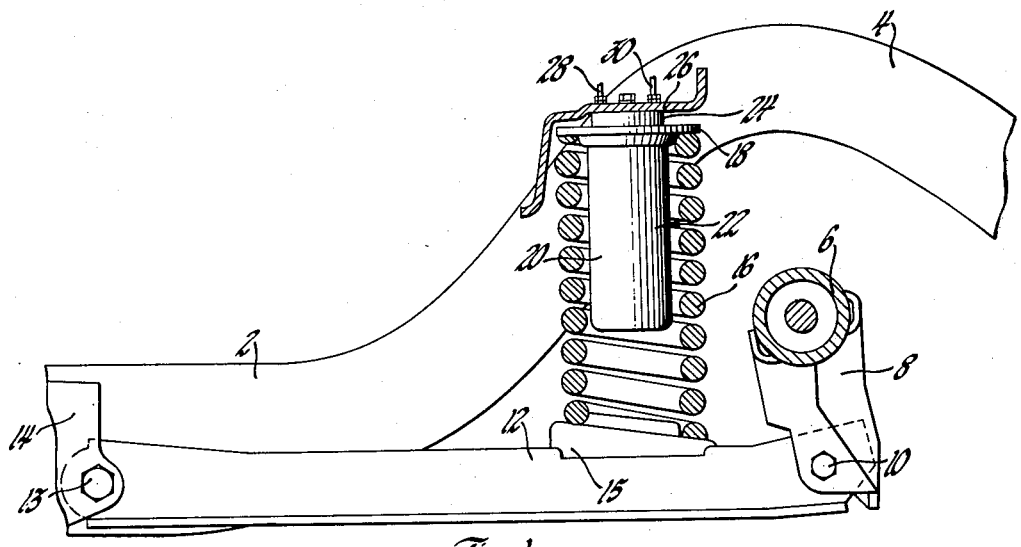
FIG. 1 is a partially sectioned side elevational view with a portion of the vehicle suspension incorporating the invention.

Referring now to the drawings and particularly FIG. 1, there is shown a portion of a vehicle rear suspension in which the reference numeral 2 designates a longitudinally extending frame side rail which includes a kick-up portion 4 overlying one end of a transversely disposed vehicle axle housing 6. Axle housing 6 has rigidly connected thereto a depending bracket 8, the lower end of which is pivotally connected at 10 to the rear end of a longitudinally extending control arm 12. The forward end of control arm 12 in turn is pivotally connected at 13 to a bracket 14 mounted on side wall 2. Rigidly secured longitudinally intermediate of control arm 12 is a lower spring seat 15 on which the lower end of a coil spring 16 rests. The upper end of spring 16 in turn engages a flange 18 formed on the cylinder portion 20 of a vertically displaceable upper spring seat assembly 22. Assembly 22 includes a piston element 24, the upper end of which is rigidly secured to an outrigger bracket 26 mounted on frame kick-up 4 vertically adjacent lower spring seat 15. The cylinder portion 20 of assembly 22 telescopingly engages piston 24 and is adapted to be displaced downwardly relative to the piston by introduction of hydraulic fluid through a conduit 28 so that as coil spring 16 is compressed as a result of increased loading on frame 2, the flange portion 18 of cylinder 20 descends relative to the frame an amount equal to the compression deflection of the coil spring and thereby restores the sprung mass to the height existing under normal load. An exhaust conduit 30 provides for discharge of hydraulic fluid from the assembly when vehicle loading decreases, thereby allowing cylinder 20 to ascend as the coil spring compression decreases.

To automatically regulate flow of hydraulic fluid into and out of assembly 22 in accordance with the present invention, there is provided a pressure modulated control valve assembly which is contained entirely within the assembly 22. This valve assembly, unlike prior art constructions, senses and responds to pressure change occurring in the displaceable spring seat 22 as a result of increased or decreased load on the vehicle sprung mass. In contrast, prior art constructions utilize linkages or other height sensing mechanisms between the sprung and unsprung mass which actuate fluid pressure devices until the desired height has been restored.

Figure 2:
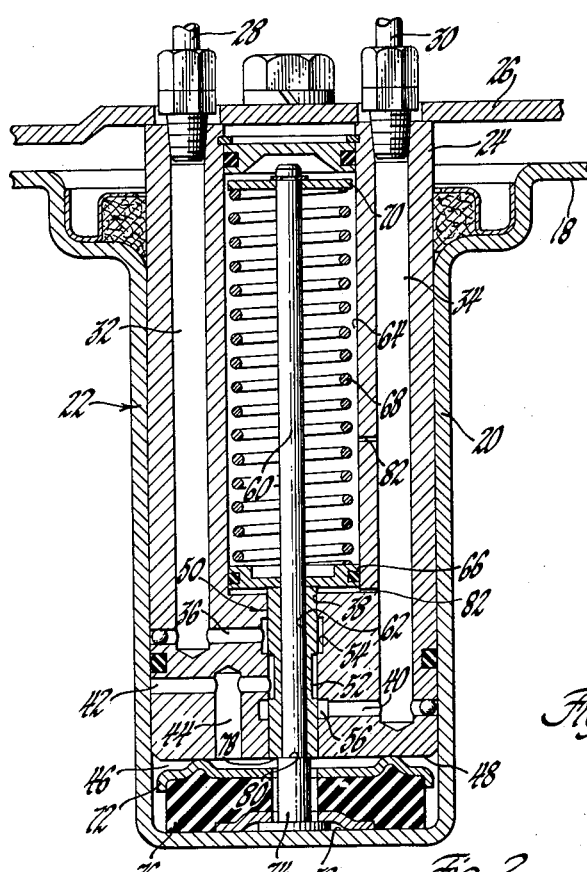
FIG. 2 is an enlarged sectional elevational view illustrating the detail of construction of the displaceable spring seat assembly shown in FIG. 1, the elements of the control mechanism being shown in the neutral position obtaining under normal loading of the vehicle sprung mass.

As seen best in FIG. 2, piston 24 is provided with a pair of depending parallel passages 32 and 34 which communicate at their upper ends with intake conduit 28 and exhaust conduit 30, respectively. At its lower end, conduit 32 communicates with a transverse passage 36 which emerges into a central vertical bore 38 formed coaxially of piston 24. The lower end of exhaust passage 34 in turn communicates with a transverse passage 40 which also emerges into central vertical bore 38 at a level vertically below passage 36 and on the opposite side of bore 38. A third transverse passage 42 extends through piston 24 vertically intermediate of passages 36 and 40 and also emerges into bore 38. Passage 42 communicates with a short vertical bore 44 which extends through the lower end of piston 24 and communicates with the cavity 46 formed between the base 48 of piston 24 and the lower end of cylinder 20.

Figure 3:
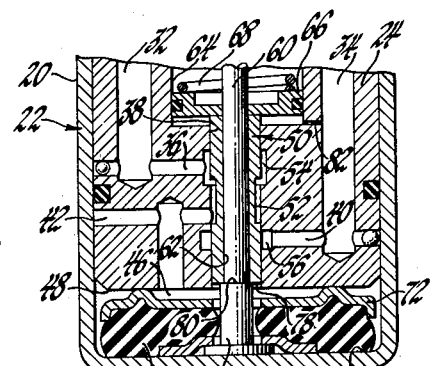
FIG. 3 is a fragmentary sectional view of a portion of FIG. 2 showing the control mechanism elements in positions occupied when the load on the sprung mass is increased above the normal level.
Figure 4:
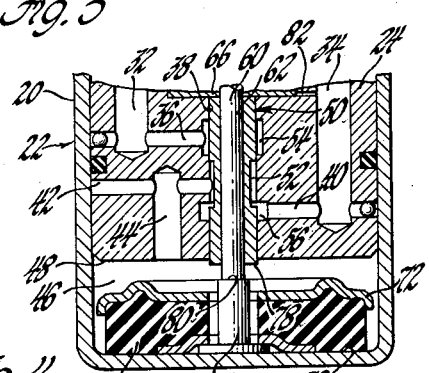
FIG. 4 is a view similar to FIG. 3 showing the relative positions of the control elements when the load on the sprung mass is decreased.

According to one feature of the invention, a spool valve 50 is slidably disposed in bore 38 and is provided with a single reduced diameter annular portion 52. Bore 38 in turn is formed with an upper enlarged annular portion 54 and a lower enlarged annular portion 56 which are spaced apart vertically a distance slightly in excess of the vertical dimension of the reduced portion 52 of spool 50. Therefore, when spool valve 50 occupies the axial position shown in FIG. 2, fluid flow through passages 36, 40 and 42 is prevented. However, as shown in FIG. 3, when spool valve 50 is displaced upwardly relative to piston 24, relieved portion 52 slightly overlaps enlarged portion 54 sufficiently to provide communication between passage 36 and passage 42, thereby allowing pressurized hydraulic fluid from conduit 28 to enter the cavity 46 and cause the cylinder 20 to be displaced downwardly relative to piston 24. Conversely, as seen in FIG. 4, when spool valve 50 is displaced downwardly from the neutral position shown in FIG. 2, relieved portion 52 slightly overlaps the lower enlarged portion 56 and permits communication between bore 42 and bore 40, thereby allowing fluid entrapped between piston 24 and cylinder 20 to exhaust through passage 34 and conduit 30.

According to another feature of the invention, the axial position of spool valve 50 relative to bore 38 is modulated in accordance with variation in the load imposed on the sprung mass or frame 2 of the vehicle so that the valve occupies the position shown in FIG. 2 only when the cylinder 20 has been displaced downwardly relative to piston 24 a distance corresponding to the compression deflection of coil spring 16 induced by increased loading of the sprung mass. As seen best in FIG. 2, the base 58 of cylinder 20 has a vertically extending rod 60 attached thereto which extends upwardly through a bore 62 in spool valve 50 and emerges into an enlarged elongated cylindrical cavity 64 formed in piston 24 axially adjacent to and aligned with bore 38. Slidably disposed in cavity 64 and surrounding rod 60 immediately axially adjacent the upper end of spool 50 is a piston 66, the upper face of which serves as a lower seat for a light coil spring 68. The upper end of spring 68 in turn is seated on a washer 70 keyed to the upper end of rod 60. Spring 68 is placed under a predetermined load between washer 70 and piston 66 so that the latter exerts a downward force on spool valve 50 urging the latter to the neutral position shown in FIG. 2. During all phases of operation of the device, with one exception shortly to be described, the downward force of spring 68 is resisted by force exerted upwardly on the lower end of spool valve 50 by hydraulic fluid entrapped between piston 24 and cylinder 20. Since the pressure exerted by the entrapped fluid will vary directly with variation in load imposed on the sprung mass of the vehicle, it will be seen that valve 50 will be urged upwardly when load is increased and will remain in the upwardly displaced position as long as fluid pressure exceeds the opposing pressure of spring 68. As additional hydraulic fluid is introduced into the cavity 46, cylinder 20 and rod 60 attached thereto will be hydraulically displaced downwardly relative to piston 24 and will therefore progessively compress spring 68 until the downward force exerted thereby on valve 50 equals the upward hydraulic force exerted on valve 50, at which time valve 50 will be restored to neutral position and hence terminate further intake flow of hydraulic fluid. Conversely, when load is decreased, the effective pressure of entrapped hydraulic fluid on valve 50 is reduced and the latter will then be urged downwardly by the relatively higher pressure of spring 68, in which position valve 50 will remain until the cylinder 20 and rod 60 have ascended sufficiently to relax coil spring 68 until the pressure thereof again equals the opposing hydraulic pressure on spool valve 50, at which time the latter will be restored to neutral position. In the embodiment shown, the rate of spring 68 is preferably such that restoration of spool valve 50 to the neutral position is achieved whenever the spring 68 is compressed an amount equal in length to the compression deflection of spring 16 produced by the imposition of additional load on the sprung mass. It will be understood, of course, that the rate of spring 68 required to achieve this objective will vary according to the effective diameter of the lower end of spool valve 50 subject to hydraulic pressure from the fluid within cavity 46.

The exception in mode of operation previously alluded to occurs when the cylinder 20 is completely retracted relative to piston 24 to the position shown in FIG. 2, in which position the lower end 48 of the piston mechanically engages a washer 72 surrounding the lower end 74 of rod 60. Washer 72, in turn, is supported on the bottom wall 58 of cylinder 20 by an annular elastic element 76, the purpose of which will shortly be described. With the piston and cylinder in the completely retracted position described, the lower end 78 of spool valve 50 is brought into direct abutting contact with the shoulder 80 formed at the upper end of rod portion 74. Therefore, initial upward movement of valve 50 to initiate hydraulic fluid intake results from positive mechanical displacement by the shoulder 80 when cylinder 20 moves upwardly under the influence of sufficient increase in sprung load to compress the resilient element 76, as illustrated in FIG. 3. However, as soon as hydraulic fluid intake commences, direct mechanical engagement between shoulder 80 and spool 50 is replaced by hydraulic pressure acting against the lower end 78 of the spool and all subsequent variations in displaced relation between the piston 24 and cylinder 20 occur as a result of pressure balancing between spring 68 and the fluid entrapped in cavity 46.

The purpose of the elastic element 76 according to another feature of the invention is to permit moderate increase in vehicle sprung load without causing leveling action. It will be apparent that by selecting a material of suitable elasticity, any desired amount of initial load increase may be accommodated before normal leveling action occurs. In all instances, of course, the required load increase must be sufficient to distort the elastic element sufficiently to allow shoulder 80 of rod 60 to displace spool valve 50 the requisite amount to initiate hydraulic fluid intake. It will also be apparent that under conditions of normal sprung load, the flexible resistance offered by element 78 will overcome any tendency of the device to operate during transient spring deflections which occur in normal vehicle operation.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination, a sprung mass, an unsprung mass, a fixed spring seat on the unsprung mass, a fluid operated extensible spring seat on the sprung mass, a coil spring disposed between said seats, and reaction operated control means disposed entirely between said extensible spring seat and said sprung mass responding directly to load increase on said sprung mass to control flow of fluid into and out of said extensible spring seat so that the displaced relation thereof equals the amount of coil spring compression resulting from increased load.

2. In combination, a sprung mass, an unsprung mass, a fixed spring seat on one mass, a hydraulically displaceable spring seat on the other mass, a coil spring disposed between said seats, and means responding directly to load increase on said sprung mass operable to control flow of fluid into and out of said displaceable spring seat so that the displaced relation thereof equals the amount of coil spring compression resulting from increased load, said means including a valve acted on by an additional coil spring arranged in series relation with said first mentioned coil spring.

3. In a vehicle, a sprung mass, an unsprung mass, a fixed spring seat on one mass, a hydraulically displaceable spring seat on the other mass, a coil spring disposed between said seats, and means responding directly to load increase on said sprung mass operable to control flow of fluid into and out of said displaceable spring seat so that the displaced relation thereof equals the amount of coil spring compression resulting from increased load, said means including a slide valve biased in one direction by an additional coil spring arranged in series relation with said first mentioned coil spring and in the other direction by fluid pressure within said displaceable seat.

4. In combination with a coil spring disposed between a sprung and unsprung mass, a hydraulically extensible spring seat assembly disposed between one end of said spring and the adjacent mass, said assembly comprising a piston fixed to said mass, a cup-shaped cylinder telescopingly engaging said piston to form a variable volume fluid cavity therebetween, fluid intake and exhaust means associated with said piston, a first fluid circuit between said intake means and said cavity, a second fluid circuit between said cavity and said exhaust means, a spool valve slidable relative to said piston in a path intersecting said cavities, a coil spring urging said spool valve in one direction, fluid pressure in said cavity acting to urge said spool valve in the opposite direction, said spool valve being urged to a neutral circuit blocking position when the pressure of the fluid in said cavity equals the pressure of said spring, while movement of said valve by said spring opens said intake circuit and movement of said valve by said fluid opens said exhaust circuit.

5. In combination with a primary coil spring disposed between a sprung and unsprung mass, a hydraulically extensible spring seat assembly disposed between one end of said spring and the adjacent mass, said assembly comprising a piston fixed to said mass, a cylinder telescopingly engaging said piston, fluid intake and exhaust means associated with said piston, a spool valve slidable relative to said piston, said valve having a neutral position blocking intake and exhaust flow and oppositely displaced operating positions permitting intake and exhaust flow respectivley, a secondary coil spring urging said spool valve in one direction, a fluid cavity between said piston and cylinder containing fluid under pressure urging said spool valve in the opposite direction, the pressure of said fluid in said cavity varying directly with variation in load on the sprung mass, whereby said valve is caused to modulate between neutral and the respective operating positions according to relative pressures exerted by said secondary spring and said fluid.

6. The structure set forth in claim 5 wherein the force of said secondary coil spring is calibrated so that said valve is restored to neutral position when said cylinder has been displaced relative to said piston an amount equal to the compression deflection of said primary spring caused by increase in spring load.

7. A self-adjusting extensible spring seat assembly comprising, a fixed piston having an upper cylindrical cavity, a cup-shaped cylinder telescopingly embracing said piston, a fluid intake passage and fluid exhaust passage formed in said piston, a central bore in said piston aligned with said cavity and communicating with said passages at axially spaced levels, an additional passage communicating with said bore at a level between said spaced levels and opening into the space between the end of said piston and said cylinder, a spool valve slidable in said bore, said valve having an axially intermediate relieved portion dimensioned vertically so as to concurrently overlap said intake passage and said additional passage when moved upwardly from an intermediate neutral position and to overlap said exhaust passage and said additional passage when moved downwardly from said neutral position, a rod fixed to the bottom wall of said cylinder and extending through said spool valve into said piston cavity, a coil spring surrounding said rod and compressed between the upper end thereof and the upper end of said spool valve, and shoulder means on said rod engaging the other end of said spool valve to urge the latter to the neutral position when said piston and cylinder are in a predetermined unextended relation.

8. A self-adjusting extensible spring seat assembly comprising, a fixed piston having an upper cylindrical cavity, a cup-shaped cylinder telescopingly embracing said piston, a fluid intake passage and fluid exhaust passage formed in said piston, a central bore in said piston aligned with said cavity and communicating with said passages at axially spaced levels, an additional passage communicating with said bore at a level between said spaced levels and opening into the space between the end of said piston and said cylinder, an annular spool valve slidable in said bore, said valve having an axially intermediate annular relieved portion dimensioned vertically so as to concurrently overlap said intake passage and said additional passage when moved upwardly from an intermediate neutral position and to overlap said exhaust passage and said additional passage when moved downwardly from said neutral position, a rod fixed to the bottom wall of said cylinder and extending through said spool valve into said piston cavity, a coil spring surrounding said rod and compressed between the upper end thereof and the upper end of said spool valve, and shoulder means on said rod engaging the other end of said spool valve to urge the latter to the neutral position when said piston and cylinder are in a predetermined unextended relation.

9. The structure set forth in claim 8 including a resilient element disposed between the bottom wall of said cylinder and the lower end of said piston, said resilient element permitting sufficient additional piston and cylinder retraction from said predetermined unextended relation so that said shoulder means will initially positively displace said valve to said upwardly displaced position.

References Cited in the file of this patent

UNITED STATES PATENTS

| 2,687,311 | Nallinger | Aug. 24, 1954 |
| 2,977,134 | Helling | Mar. 28, 1961 |